United States Patent
Simon et al.

(10) Patent No.: US 9,948,174 B2
(45) Date of Patent: Apr. 17, 2018

(54) DEVICE FOR PROVIDING PROTECTION AGAINST SHORT CIRCUITS UPSTREAM FROM A POWER MODULE

(71) Applicant: SAFRAN ELECTRICAL & POWER, Blagnac (FR)

(72) Inventors: Jean-Jacques Simon, Saint-Gratien (FR); Nicolas Dheilly, Lieusaint (FR); Roland Casimir, Saint Germain en Laye (FR)

(73) Assignee: Safran Electrical & Power, Blagnac (FR)

( * ) Notice: Subject to any disclaimer, the term of this patent is extended or adjusted under 35 U.S.C. 154(b) by 13 days.

(21) Appl. No.: 15/030,170

(22) PCT Filed: Oct. 15, 2014

(86) PCT No.: PCT/FR2014/052624
§ 371 (c)(1),
(2) Date: Apr. 18, 2016

(87) PCT Pub. No.: WO2015/055951
PCT Pub. Date: Apr. 23, 2015

(65) Prior Publication Data
US 2016/0276920 A1    Sep. 22, 2016

(30) Foreign Application Priority Data
Oct. 18, 2013    (FR) ...................................... 13 60159

(51) Int. Cl.
*H02M 3/335* (2006.01)
*H02M 1/32* (2007.01)
(Continued)

(52) U.S. Cl.
CPC .............. *H02M 1/32* (2013.01); *B64D 47/00* (2013.01); *H02H 7/1222* (2013.01); *H02H 9/02* (2013.01);
(Continued)

(58) Field of Classification Search
CPC .......... H02M 1/32; H02M 1/126; H02M 7/04; B64D 47/00; H02H 7/1222; H02H 9/001
(Continued)

(56) References Cited

U.S. PATENT DOCUMENTS 4,563,720 A    1/1986 Clark
4,843,515 A    6/1989 Richman
(Continued)

FOREIGN PATENT DOCUMENTS

EP    0 164 193 A1    12/1985

OTHER PUBLICATIONS

International Search Report dated Feb. 6, 2015 for PCT/FR2014/052624 filed on Oct. 15, 2014.

*Primary Examiner* — Dinh T Le
(74) *Attorney, Agent, or Firm* — Oblon, McClelland, Maier & Neustadt, L.L.P.

(57) ABSTRACT

The protection device for providing protection against short-circuits upstream from an electrical power supply module having an inlet filter with at least one capacitor and an inductor and having a converter with components associated with a plurality of freewheel diodes includes at least one auxiliary winding and a dissipator element associated with the inlet filter, thereby making it possible to provide an inlet filter of small size without over dimensioning the freewheel diodes.

7 Claims, 5 Drawing Sheets

(51) Int. Cl.
    *H02M 1/12*     (2006.01)
    *H02H 7/122*    (2006.01)
    *B64D 47/00*    (2006.01)
    *H02H 9/02*     (2006.01)
    *H02M 7/04*     (2006.01)
    *H02H 9/00*     (2006.01)

(52) U.S. Cl.
    CPC .............. *H02M 1/126* (2013.01); *H02M 7/04* (2013.01); *H02H 9/001* (2013.01)

(58) Field of Classification Search
    USPC ............................................................ 307/9
    See application file for complete search history.

(56) References Cited

U.S. PATENT DOCUMENTS

| | | | | |
|---|---|---|---|---|
| 5,559,396 A * | 9/1996 | Bruning | .............. | H02M 1/4266 |
| | | | | 315/209 R |
| 6,414,866 B2 * | 7/2002 | Huggett | .................. | H02M 1/15 |
| | | | | 363/124 |
| 6,876,556 B2 * | 4/2005 | Zhu | ......................... | H02M 1/34 |
| | | | | 363/17 |

* cited by examiner

DEVICE FOR PROVIDING PROTECTION AGAINST SHORT CIRCUITS UPSTREAM FROM A POWER MODULE

TECHNICAL FIELD AND PRIOR ART

The invention lies in the field of electrical power supply modules, in particular for electrical power distribution racks used in aircraft.

An electrical power supply module, referred to more simply as a "power module", is powered from a direct current (DC) electrical energy source, possibly obtained by rectification and via an alternating current (AC) transformer, and including an inlet filter having at least one capacitor. The power module comprises at least one converter, which itself includes in particular inductors and freewheel diodes, possibly incorporated in switch components.

Usually, a plurality of optionally identical power modules are operated from a common electricity source and they may be associated in parallel in a power distribution rack in order to power a common load.

When the volume of an inlet filter is minimized, a converter is found to be particularly vulnerable to short-circuit at its inlet, where such a short-circuit constitutes a common mode of failure in power distribution racks. A short-circuit can cause excessive current to flow in the power module, and in particular in the freewheel diodes of the converter.

In order to remedy that problem, it is general practice to add cut-off members such as fuses, contactors, or circuit breakers. In addition to the complexity due to those additional members, that leads to operation being interrupted, which can be inconvenient and might even affect safety.

The extent to which the size of an inlet filter can be reduced, as is necessary to enable it to be incorporated in a power distribution rack, is limited for the capacitor C, since it needs to be dimensioned to be capable at least of supplying the current required by the converter, and is limited for the inlet inductor L by the minimum inductance authorized in particular because of constraints on emitting interference in the electromagnetic compatibility (EMC) sense. Under such circumstances, the current produced by a short-circuit at the inlet is given by:

$$-U\sqrt{L/C}$$

A small value for L contributes to reducing the volume of the inlet filter, thereby increasing the current produced by a short-circuit.

This current flows through the freewheel diodes for a considerable length of time, which means that the diodes need to be over dimensioned.

There thus exists a need to provide an inlet filter that is of small size, while ensuring that, in the event of a short-circuit at the inlet of the filter, the current that flows through the freewheel diodes of a converter of a power module is not too great, and that it does not flow for too long.

OBJECT AND DEFINITION OF THE INVENTION

The invention seeks to remedy the above-mentioned drawbacks and to make it possible in particular to protect power modules against inlet short circuits in a manner that is simple and reliable, and without leading to an untimely interruption of the operation of the power module.

In order to resolve the above-mentioned problems, there is provided a protection device for providing protection against short-circuits upstream from an electrical power supply module having an inlet filter with at least one capacitor and an inductor, and having a converter with a plurality of freewheel diodes, the device being characterized in that it comprises at least one auxiliary winding coupled to said at least one inductor of the inlet filter and a dissipator element connected to said at least one auxiliary winding, said dissipator element being adapted to dissipate the energy stored in said at least one capacitor of the inlet filter in the event of a short-circuit occurring at the inlet of said inlet filter.

More particularly, the dissipator element may be constituted by a resistor of the braking resistance type.

In a particular embodiment, a switch member, such as an active component or a magnetic amplifier, is configured to allow the current to flow in said auxiliary winding only when the switch member has detected a malfunction due to the short-circuit, such as a sudden drop in the voltage across the terminals of the capacitor of the inlet filter or an overcurrent within the converter.

The invention is particularly applicable to power modules for providing an electrical power supply in aircraft.

BRIEF DESCRIPTION OF THE DRAWINGS

Other characteristics and advantages of the invention appear from the following description of particular embodiments given as examples with reference to the accompanying drawings, in which.

DETAILED DESCRIPTION OF PREFERRED EMBODIMENTS

Figure 1:
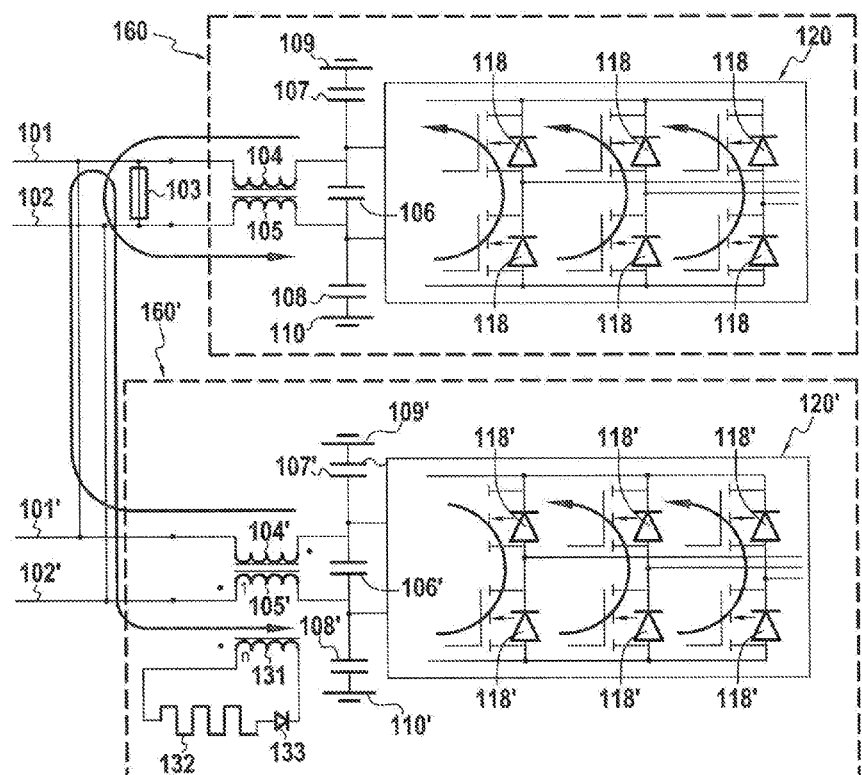
FIG. 1 is a diagrammatic view of an embodiment of a device in accordance with the invention for providing protection against short circuits upstream from power modules.

FIG. 1 is a diagram of a device of the invention for providing protection against short-circuits upstream from power modules 160, 160' that are designed for electrically powering equipment, in particular within an aircraft where electrical power supply devices need to be capable of powering more and more equipment at ever higher powers.

In FIG. 1, there can be seen a diagram of two power modules 160, 160', each comprising in particular at least one converter 120, 120' including amongst other components inductors and switch components associated with freewheel diodes 118, 118' that may optionally be integrated with the switch components. Each power module 160, 160' is powered from a DC source via lines 101, 102; 101', 102' and via an inlet filter comprising inductors 104, 105; 104', 105' that are optionally coupled with capacitors 106 to 108; 106' to 108' that are optionally connected to the frame 109, 110; 109', 110'.

FIG. 1 also shows an auxiliary winding 131 that is connected to a dissipator element 132 and a diode 133, and that is coupled to one of the inductors 105' of the inlet filter.

The dissipator element 132 may be constituted by a resistor of the braking resistance type or by some other dissipator device that is capable of dissipating the energy stored in a capacitor of the inlet filter by means of the auxiliary winding 131, which comes into action when a short-circuit 103 arises at the inlet of the filter, e.g. a short-circuit between the lines 101 and 102 as shown by way of example in FIG. 1.

Figure 3A:
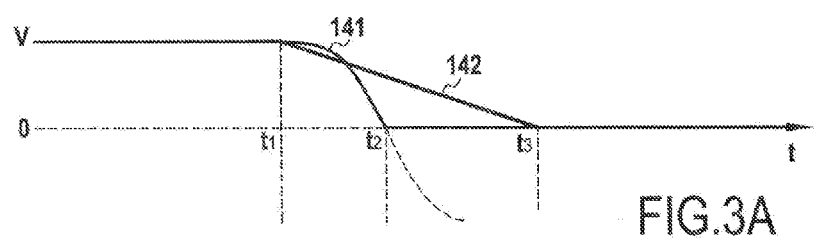
FIG. 3A plots curves showing how the voltage across the terminals of an inlet filter capacitor of a power module varies as a function of time in the event of a short-circuit at the inlet, respectively with and without the protection device of the invention.

FIG. 3A shows how the voltage across the terminals of the capacitor 106 or 106' varies in the event of the short-circuit 103 appearing at an instant t1, firstly when the auxiliary winding 131 and the dissipator element 132 are not used (curve 141), which constitutes the prior art, and secondly in the presence of the auxiliary winding 131, the dissipator element 132, and the diode 133 in accordance with the invention (curve 142).

Furthermore, FIG. 3A shows instants t2, t3 that correspond to the beginning of conduction by the freewheel diodes of the converter 120, 120', respectively without and with the auxiliary winding and the dissipator element. It can be seen that the drop in the voltage across the terminals of the capacitor 106 or 106' is much slower with the protection device of the invention (curve 142) than without the device (curve 141).

Figure 3B:
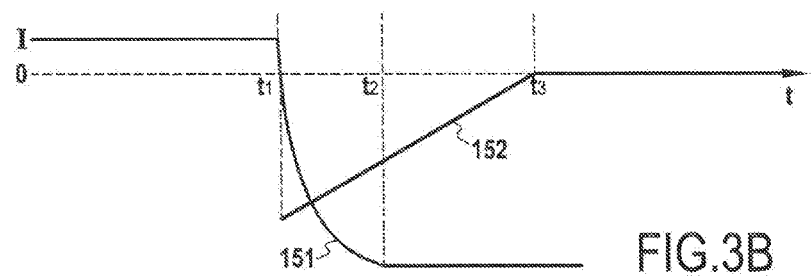
FIG. 3B plots curves showing how the current at the inlet of a power module, written Is1 in FIG. 2, varies as a function of time in the event of an upstream short-circuit, respectively with and without the protection device of the invention.

FIG. 3B shows how the current to the power module 160, 160' varies in the event of a short-circuit 103 appearing at an instant t1, firstly when the auxiliary winding 131 and the dissipator element 132 are not used (curve 151), which constitutes the prior art, and secondly in the presence of the auxiliary winding 131, the dissipator element 132, and the diode 133 of the invention (curve 152). FIG. 3B also shows the instants t2, t3 that correspond to the beginning of conduction by the freewheel diodes of the converter 120, 120' respectively without and with the auxiliary winding of the dissipator element. It can be seen that the short-circuit current is much more limited with the protection device of the invention (curve 152) than without the device (curve 151).

In more particular manner, the short-circuit current without the auxiliary winding 131 (curve 151) presents a value equal to:

$$-U/\sqrt{L/C}$$

where L is the inductance of the inductor 104, 105; 104', 105' of the inlet filter, and where C is the capacitance of the capacitor 106, 106' of the inlet filter.

In contrast, the short-circuit current with an auxiliary winding 131 having a turns ratio of n relative to the number of turns of the inductor 105; 105', and with a dissipator element 132 having a resistance R, (curve 152) presents a value equal to:

$$-U/(R/n^2)$$

that, with suitably selected values for R and n, can be very significantly less than the current without the protection device 131 to 133, assuming that there exist constraints on selecting the values L and C for the inlet filter, which values are associated with the operation of the converters 120, 120' of the power modules 160, 160', which constraints do not apply for the auxiliary protection circuit 131 to 133.

FIG. 1 shows two power modules 160, 160', but naturally the invention applies to a greater number of power modules powered from parallel power supplies from a common DC voltage source.

Figure 2:
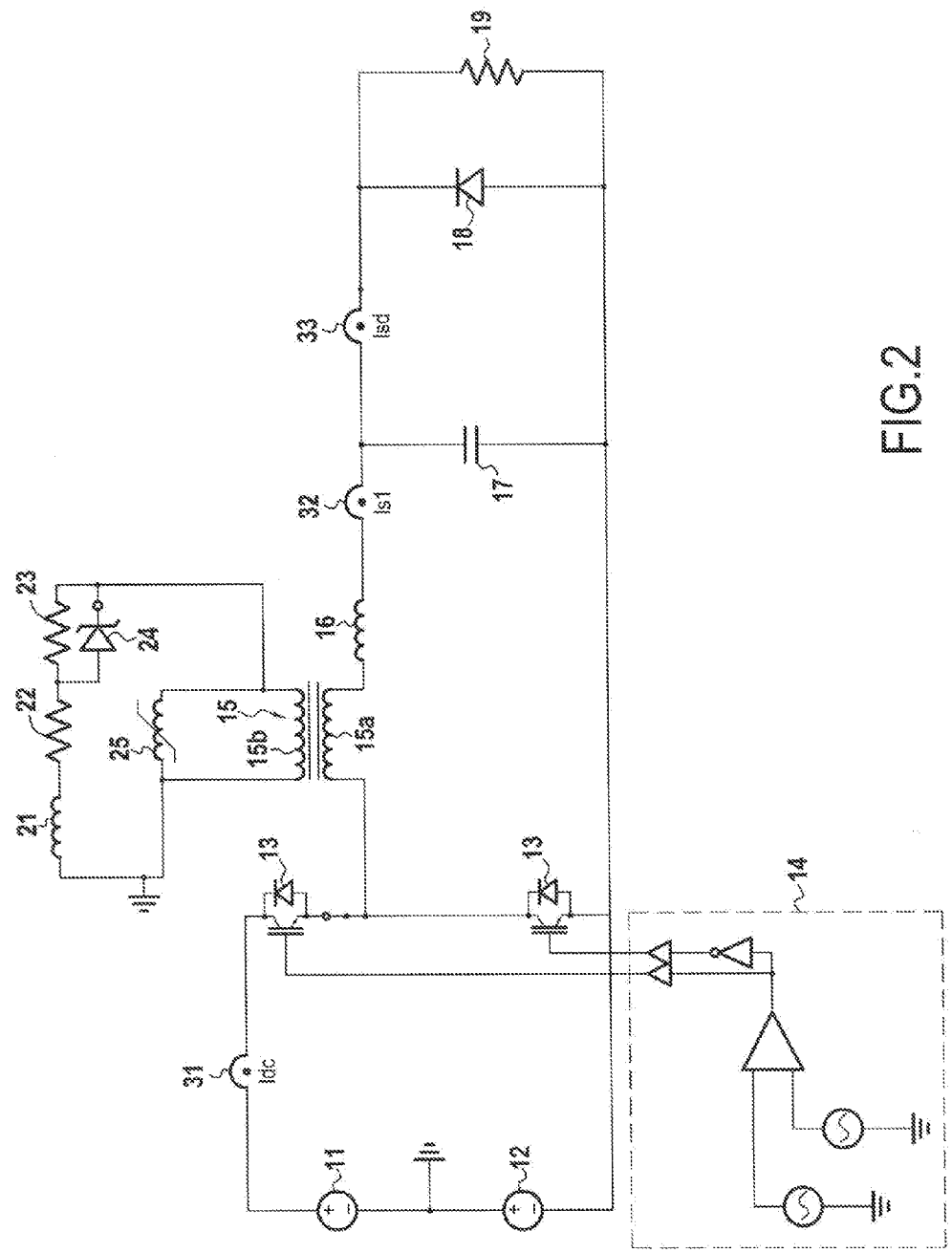
FIG. 2 is a more detailed view of another embodiment of the invention.

FIG. 2 shows a particular embodiment of a protection device of the invention with measurement means for characterizing the effect of the protection device of the invention.

In FIG. 2, the primary 15a of a transformer 15 is powered using switches 13 controlled by a control circuit 14 for alternating between connection to the power supply 11, 12 and operating with an upstream short-circuit; the power supply is made up of DC voltage sources 11, 12 (e.g. each at 300 volts (V)).

The secondary 15b of a transformer 15 is connected to a series of elements contributing to limiting current, such as inductors 21, 25, resistors 22, 23, and a Zener diode 24.

In accordance with the invention, a secondary constituting an auxiliary winding 15b is associated with the primary 15a of the transformer 15. A power module with its inlet filter and its converter are represented symbolically by a capacitor 17, a diode 18, and a load resistance 19 that form a parallel connection with one of its ends connected to the terminal of an inductor 16 that is not connected to the primary 15a of the transformer 15, and with its other end connected to the switches 13.

In order to take measurements, a current probe 31 is connected in series with the DC voltage sources 11, 12 in order to measure a current Idc, a current probe 32 is connected between the inductor 16 and the capacitor 17 to measure a current Is1, and a current probe 33 is connected between the capacitor 17 and the resistance 19 in order to measure a current Isd.

The secondary 15b of the transformer 15 having a primary 15a to secondary 15b transformation ratio of 1:n, the resistor 22 of resistance R, and the diode 24 perform the same functions as the elements 131 to 132 respectively of FIG. 1.

The diode 18 represents the freewheel diodes 118, 118' included in the converters 120 and 120' of FIG. 1.

Figure 4A:
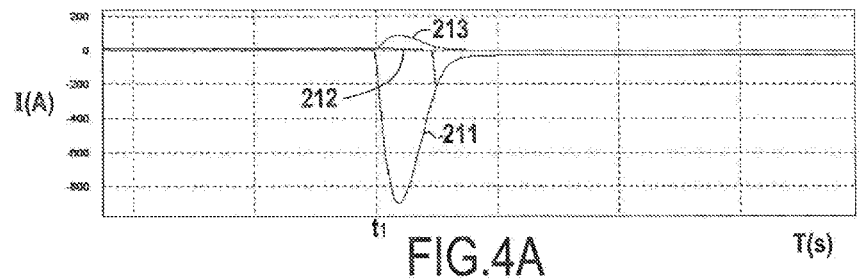
FIG. 4A plots curves showing how the current at various points of the FIG. 2 circuit varies as a function of time in the event of a short-circuit at the inlet, for a first selected resistance value.
Figure 4B:
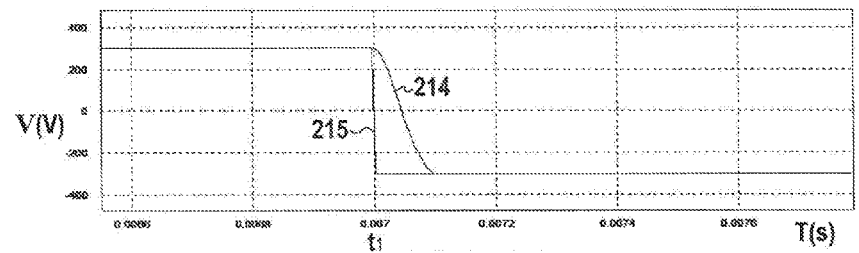
FIG. 4B plots curves showing how the voltage at various points of the FIG. 2 circuit varies as a function of time in the event of a short-circuit at the inlet for the first selected resistance value.

FIGS. 4A and 4B plot curves showing how the current and the voltage measured at various points of the FIG. 2 circuit vary over time, with a short-circuit being simulated at instant t1, for a resistor 22 having a resistance of 40 ohms and corresponding to a peak value for Isd of 200 amps (A).

Figure 5A:
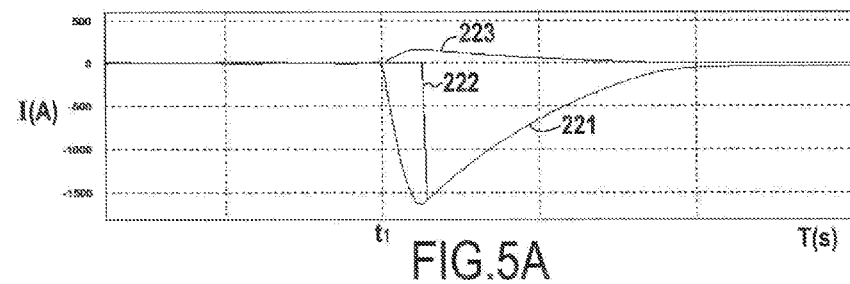
FIG. 5A plots curves showing how the current at various points of the FIG. 2 circuit varies as a function of time in the event of a short-circuit at the inlet, for a second selected resistance value.
Figure 5B:
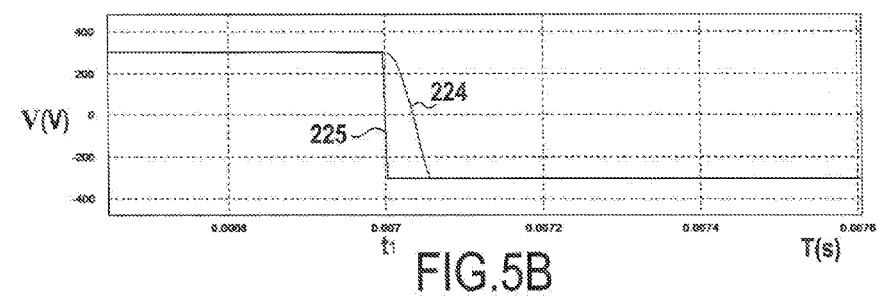
FIG. 5B plots curves showing how the voltage at various points of the FIG. 2 circuit varies as a function of time in the event of a short-circuit at the inlet for the second selected resistance value.

FIGS. 5A and 5B plot curves showing how the current and the voltage measured at various points of the FIG. 2 circuit vary over time, with a short-circuit being simulated at instant t1, for a resistor 22 having a resistance of 4 ohms and corresponding to a peak value for Isd of 1600 A.

The curves 211 and 221 in FIGS. 4A and 5A show the current Is1 measured using the probe 32.

The curves 212 and 222 of FIGS. 4A and 5A show the current Isd measured using the probe 33.

The curves 213 and 223 of FIGS. 4A and 5A show the current Isecondary measured at the secondary of the transformer 15.

The curves 214 and 224 of FIGS. 4B and 5B show the voltage Vcapa across the terminals of the capacitor 17.

The curves 215 and 225 of FIGS. 4B and 5B show the voltage Vcrowbar applied to the inlet of the power module.

In the event of a short-circuit at the inlet filter formed by the primary 15a of the transformer and the capacitor 17, it can be seen that by virtue of the measures recommended by the present invention (namely adding a single auxiliary winding 15b and a dissipator resistor 22, associated with a diode 24, to the primary 15a of the transformer 15) the repercussion on the current Isd passing through the diode 18 is greatly attenuated.

Figure 6:
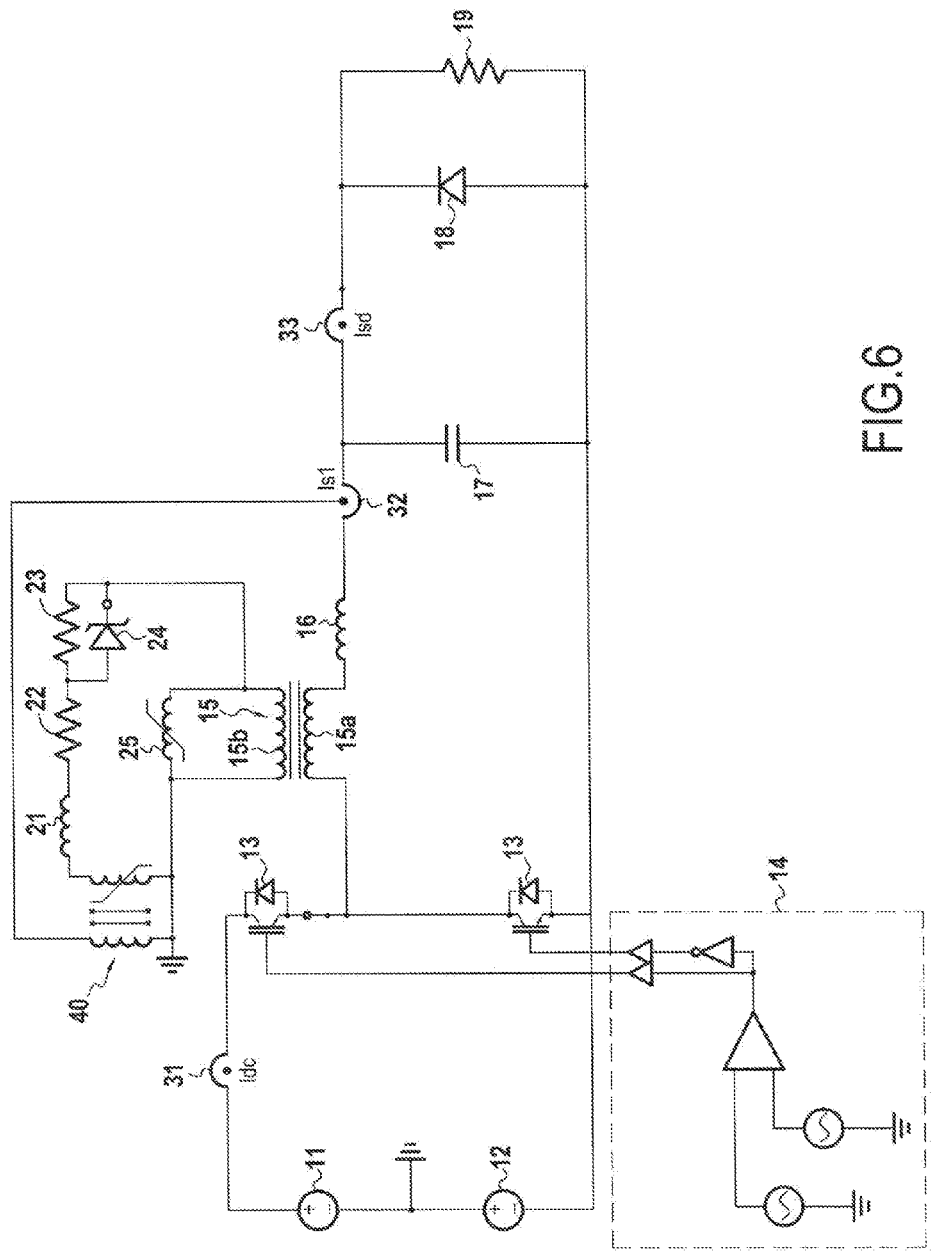
FIG. 6 shows an example of a protection device of the invention with overcurrent detection and with switching by a magnetic amplifier.

FIG. 6 shows an example of a protection device of the invention, as described above with reference to FIG. 2, including detection of overcurrent for the current Is1 as measured by the probe 32 and switching of the elements 15b and 21 to 25 as performed by a magnetic amplifier 40. Elements in common in the circuits of FIGS. 2 and 6 are given the same reference numbers.

Figure 7:
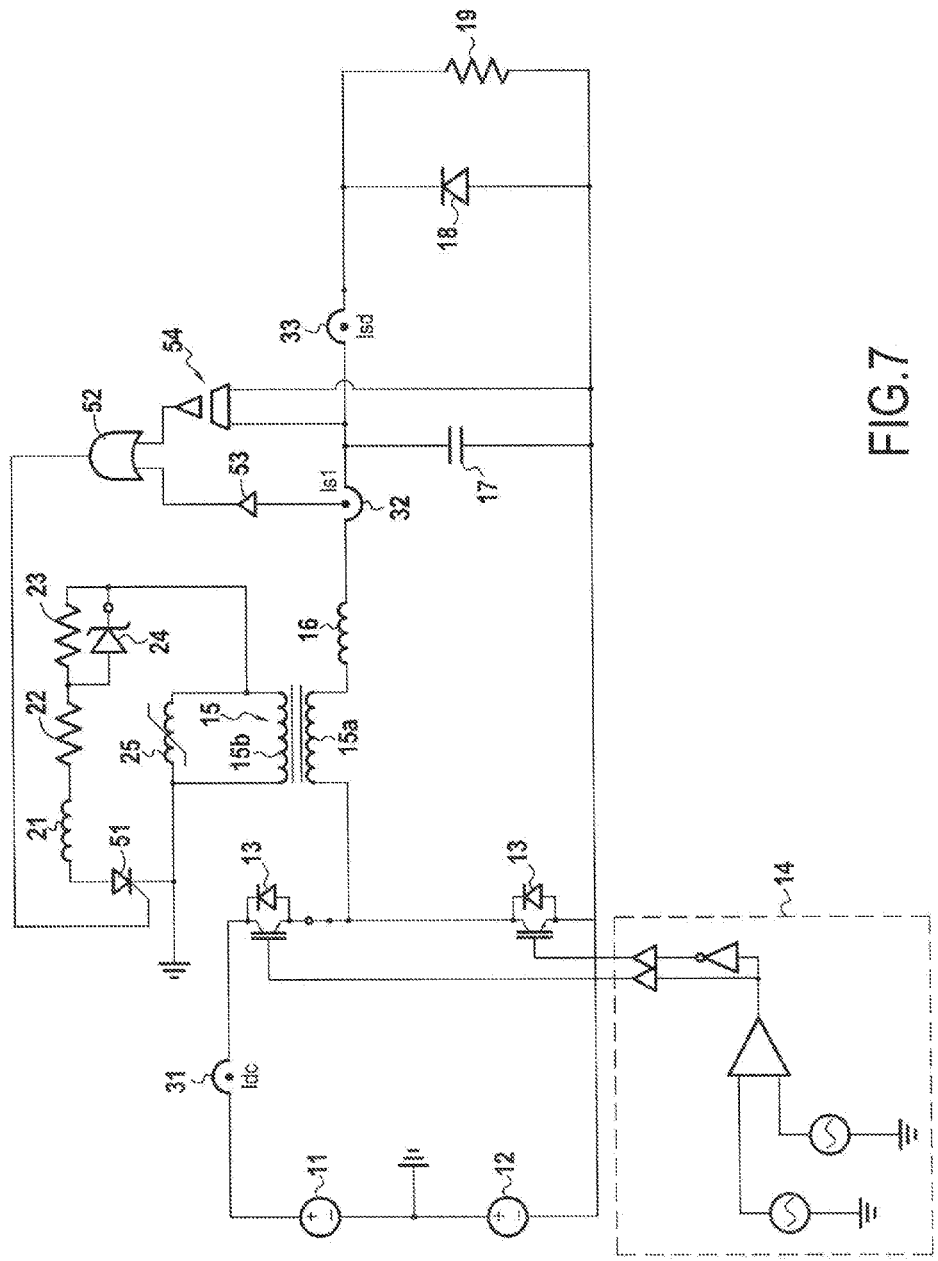
FIG. 7 shows another example of a protection device of the invention with overcurrent or under-voltage detection and with switching by an active component.

FIG. 7 shows another example of a protection device of the invention, as described above with reference to FIG. 2, including detection of overcurrent for the current Is1 measured by the probe 32, or of under-voltage across the terminals of the capacitor 17 by logic components 52 to 54 including an OR gate 52. The elements 15b and 21 to 25 are switched by an active component 51, which may for example be a thyristor having its gate connected to the output of the OR gate 52. Once more, elements in common in the circuits of FIGS. 2 and 7 are given the same reference numbers.

The invention is not limited to the embodiments described, but extends to any variant coming within the ambit of the claims.

In particular, although the dissipator element is advantageously constituted by a braking resistance, it is possible to use other dissipator devices.

The invention claimed is:

1. A protection device for providing protection against short-circuits upstream from an electrical power supply module having an inlet filter with at least one capacitor and an inductor, and having a converter with components associated with a plurality of freewheel diodes, wherein the device comprises at least one auxiliary winding coupled to said at least one inductor of the inlet filter and a dissipator element connected to said at least one auxiliary winding, said dissipator element being adapted to dissipate energy stored in said at least one capacitor of the inlet filter in an event of a short-circuit occurring at an inlet of said inlet filter, and wherein the dissipator element is constituted by a braking resistance.

2. The protection device according to claim 1, further comprising a switch member which is configured so as to allow the current to flow in said auxiliary winding only when the switch member has detected a malfunction due to the short-circuit.

3. The protection device according to claim 2, wherein the switch member is an active component.

4. The protection device according to claim 2, wherein the switch member is a magnetic amplifier.

5. The protection device according to claim 2, wherein the malfunction to be detected by the switch member is a sudden drop in the voltage across terminals of the capacitor of the inlet filter.

6. The protection device according to claim 2, wherein the malfunction to be detected by the switch member is an overcurrent within the converter.

7. The protection device according to claim 1, wherein the protection device is applied to a power module for providing an electrical power supply in an aircraft.

\* \* \* \* \*